No. 766,276. PATENTED AUG. 2, 1904.
F. H. MACKENZIE.
ASTRONOMICAL APPARATUS.
APPLICATION FILED APR. 29, 1904.
NO MODEL. 5 SHEETS—SHEET 1.

WITNESSES:
Fred S. Payne
Isaac Gridly

INVENTOR.
Franklin H. Mackenzie
BY
Arthur P. Hardy
his ATTORNEY.

No. 766,276. PATENTED AUG. 2, 1904.
F. H. MACKENZIE.
ASTRONOMICAL APPARATUS.
APPLICATION FILED APR. 29, 1904.
NO MODEL. 5 SHEETS—SHEET 2.

WITNESSES: INVENTOR.
Fred N. Payne Franklin H. Mackenzie
Isaac Gordon BY Arthur P. Hardy
his ATTORNEY.

No. 766,276. PATENTED AUG. 2, 1904.
F. H. MACKENZIE.
ASTRONOMICAL APPARATUS.
APPLICATION FILED APR. 29, 1904.
NO MODEL. 5 SHEETS—SHEET 3.

No. 766,276. PATENTED AUG. 2, 1904.
F. H. MACKENZIE.
ASTRONOMICAL APPARATUS.
APPLICATION FILED APR. 29, 1904.
NO MODEL. 5 SHEETS—SHEET 4.

WITNESSES: INVENTOR.
Fred S. Payne Franklin H. Mackenzie
Isaac Godly BY
Arthur P. Hardy
his ATTORNEY.

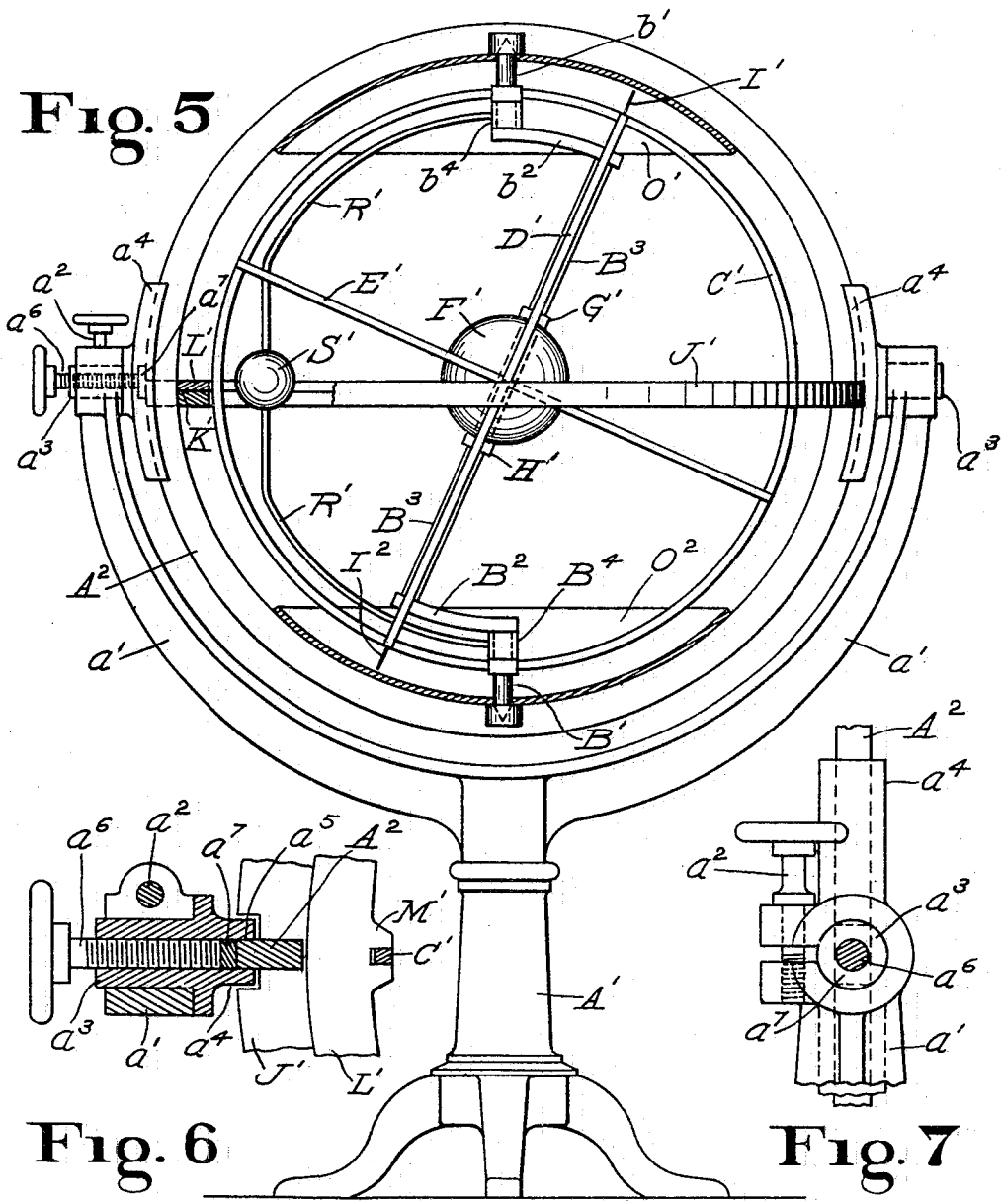

No. 766,276. Patented August 2, 1904.

UNITED STATES PATENT OFFICE.

FRANKLIN H. MACKENZIE, OF SALEM, MASSACHUSETTS.

ASTRONOMICAL APPARATUS.

SPECIFICATION forming part of Letters Patent No. 766,276, dated August 2, 1904.

Application filed April 29, 1904. Serial No. 205,490. (No model.)

*To all whom it may concern:*

Be it known that I, FRANKLIN H. MACKENZIE, a citizen of the United States, residing at Salem, in the county of Essex and State of Massachusetts, have invented new and useful Improvements in an Astronomical Apparatus, of which the following is a specification, reference being had to the accompanying drawings.

My present invention relates to that class of apparatus designed and adapted to illustrate certain facts and theories in the science of astronomy.

The object of my invention is to provide a simple yet accurate and effective device for demonstrating such facts and theories. I accomplish this object by the means hereinafter described and as illustrated in the accompanying drawings.

Figure 1:
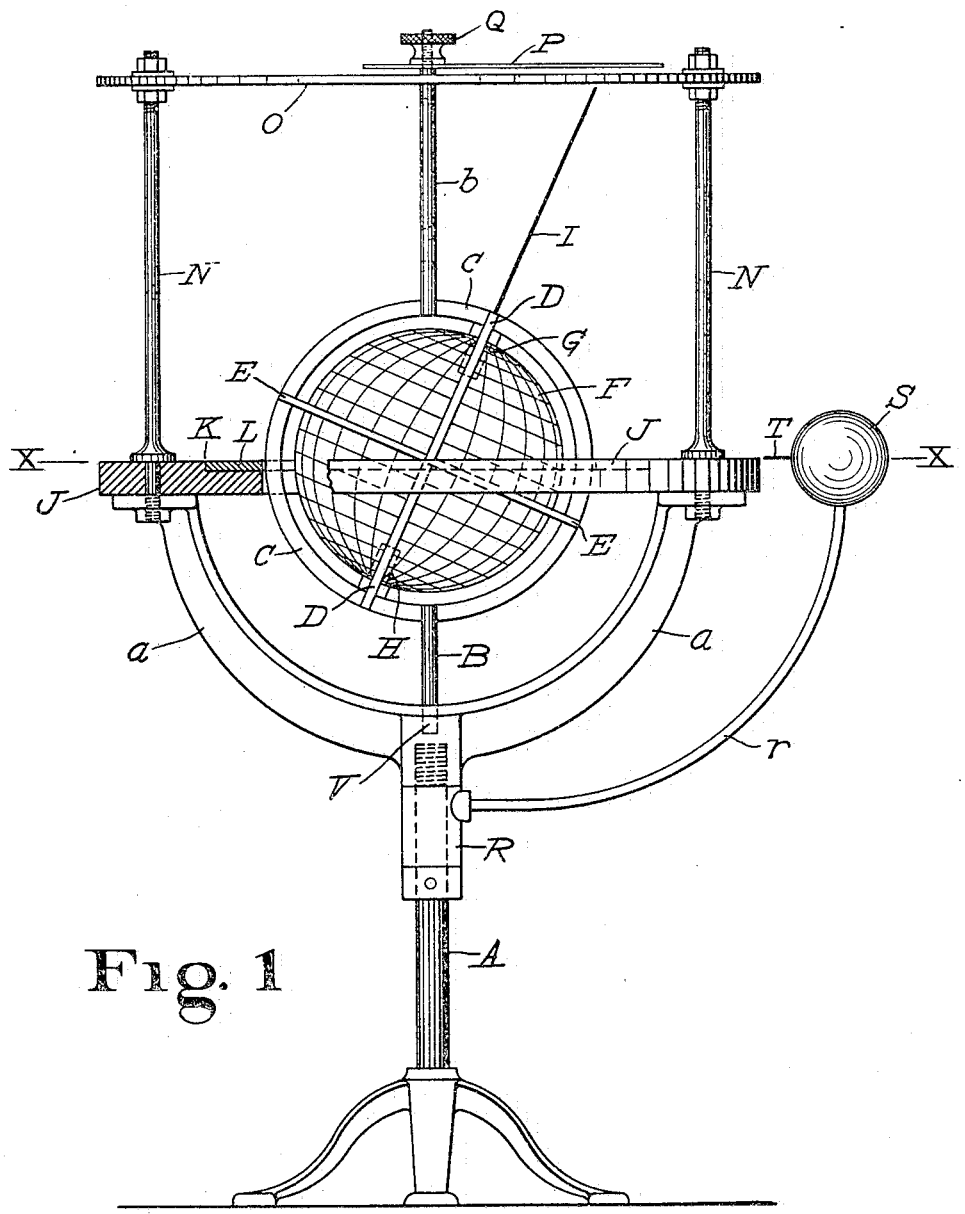
Figure 2:
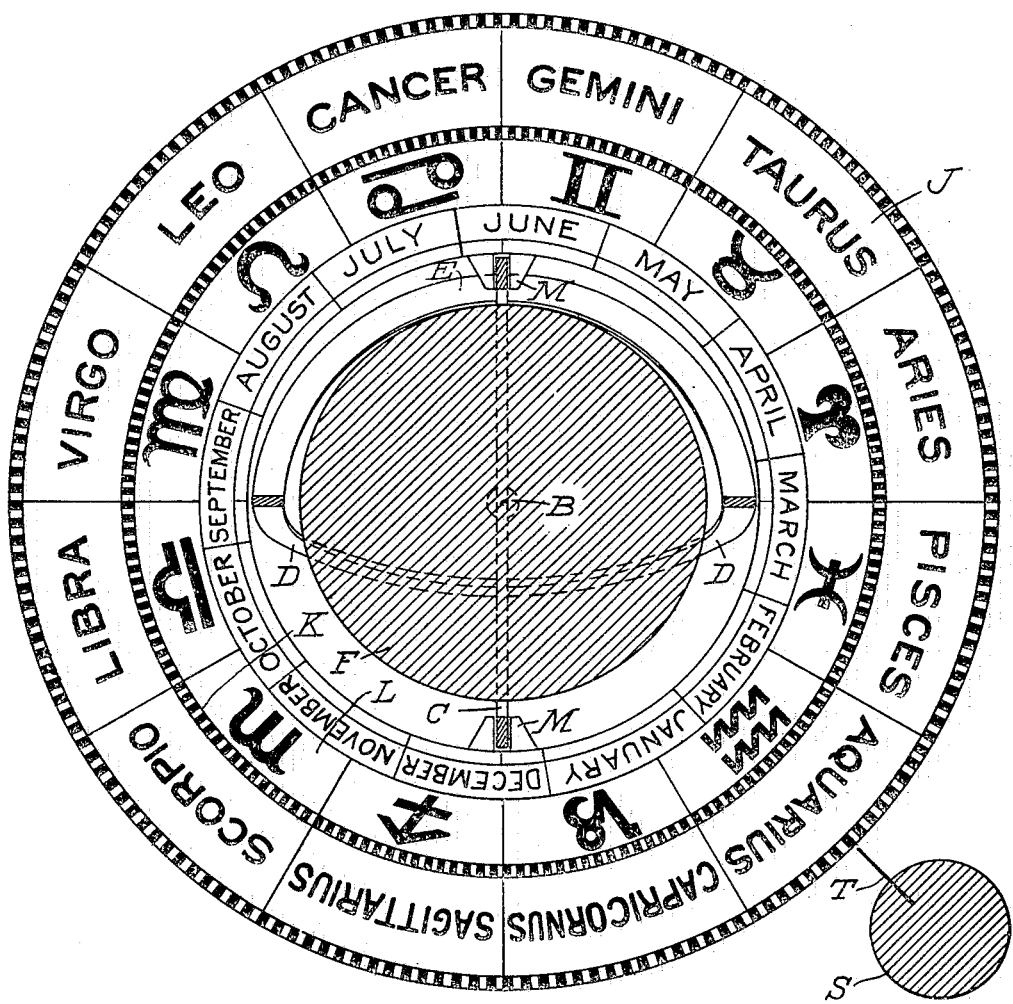
Figure 3:
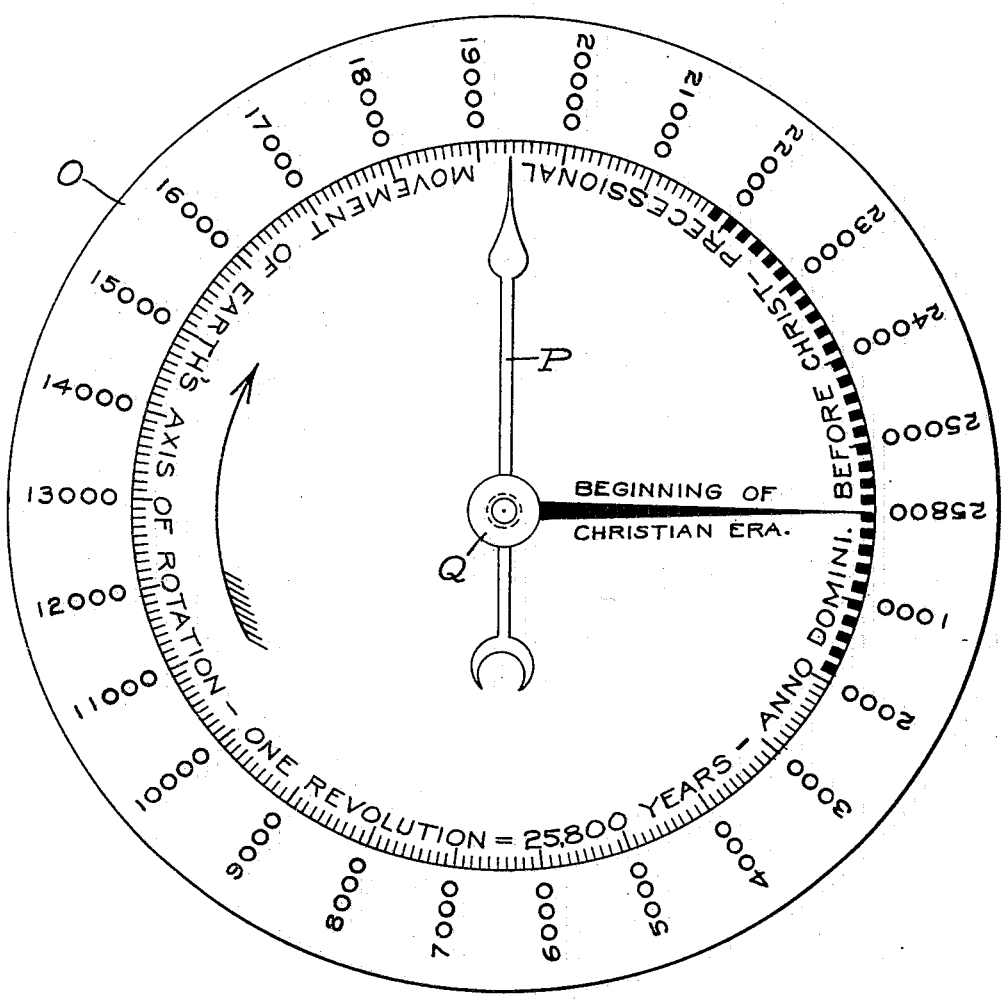
Figure 4:

Figure 1 is a side elevation of a modified form of the construction shown in Fig. 5, some of the parts being shown in section. Fig. 2 is a partial plan view along line X X shown in Fig. 1. Fig. 3 is a plan view of the dial or time-ring upon the upper side of disk O shown in Fig. 1. Fig. 4 is a plan view, looking upward, of the star-map upon the under side of disk O. Fig. 5 is a side elevation of the preferred method of constructing my invention, some of the parts being shown in section. Figs. 6 and 7 are details of parts of Fig. 5.

For the purpose of simplicity of detail Figs. 1, 2, 3, and 4 are of parts of my invention as shown in the modified form, Fig. 1, and I will now proceed to describe such modified form.

In the drawings, Figs. 1, 2, 3, and 4, A represents a base or stand having arms, two of which are shown and represented by $a\ a$. B is a rod representing the south pole of the ecliptic, one end thereof being rotatably mounted at V. The rod $b$ represents the north pole of the ecliptic and is diametrically opposite to and in alinement with rod B. One end of rod $b$ is journaled within disk O. Between rods B and $b$ and rigidly attached to each of said rods is ring C, representing the solsticial colure. At right angles to ring C and rigidly attached thereto at the points of intersection is ring D, representing the equinoctial colure. Ring E represents the equinoctial and is placed at right angles and rigidly attached to rings C and D wherever it intersects said rings. Within rings C, D, and E is globe F, representing the terrestrial sphere, pivotally mounted at points G and H on said globe, representing the north and south poles of the earth, thus allowing globe F to revolve upon an axis extending from one point of juncture of rings C and D to the other point, where said rings conjoin. Points G and H are respectively held at an angle of approximately twenty-three and one-half degrees from the axis formed by rods B and $b$. I is a pointer which represents the north pole of the heavens and is an elongation of one end of the axis upon which globe F rotates. Said pointer extends toward disk O at an angle of approximately twenty-three and one-half degrees from rod $b$. J is a ring outside of rings C, D, and E and is mounted on arms $a\ a$ at right angles to the axis formed by rods B and $b$. Ring J has a rabbet K, within which is movably placed ring L. The upper surface of ring J represents the plane of the ecliptic, and upon said upper surface may be depicted the constellations of the zodiac and the three hundred and sixty degrees comprising a circle. (See Fig. 2.) Ring L lies in a plane with ring J and is preferably constructed so that its upper surface is flush with the upper surface of ring J. The upper surface of ring L is adapted to have portrayed thereon the signs of the zodiac and the months of the year. I may, if it be desirable, also depict upon ring L the days of the month. Rigidly attached to ring L are forked ears M M, Fig. 2, so placed that ring C passes through each ear and is engaged thereby. Each of the arms $a\ a$ supports a rod N N, which in turn support a disk O. Upon the under side of disk O may be placed a star-map, Fig. 4. Upon the upper side of disk O is a dial spaced so as to represent approximately a period of twenty-five thousand eight hundred years, Fig. 3. Upon the upper side of disk O is also a hand or indicator P, held in place by thumb-nut Q, so as to rotate with rod $b$. Upon stand A is also movably mounted sleeve R, having arm $r$, which holds a sphere S, representing the sun. Sphere S has a pointer T rigidly affixed thereto so as to lie in a plane with the upper surface of ring J.

Most of the numerous facts and theories of astronomy which my invention is designed and adapted to illustrate may be demonstrated by the modified form shown in Figs. 1, 2, 3, and 4 by causing globe F and rings C, D, and E to rotate clockwise upon the axis formed by rods B and $b$, thereby actuating ring L and pointers I and P, and by causing sphere S to circulate around ring J counter-clockwise.

Having described the most simple form for the construction of my invention and its mode of operation, I will now describe the preferred form of construction. (Shown in Fig. 5.) A′ is a base or stand having arms $a'\ a'$. The upper end of each arm $a'\ a'$ is journaled to receive the clamping device. (Shown in detail in Figs. 6 and 7.) A² is a ring movably secured in place by said clamping device. B′ is a crank-pin representing the south pole of the ecliptic and is rotatably mounted on ring A². The north pole of the ecliptic is represented by crank-pin $b'$, which is also rotatably mounted on ring A², but at a point diametrically opposite to and in alinement with pin B′. Crank-pins B′ and $b'$ have rigidly attached thereto and preferably cast integral therewith arms B² and $b^2$, respectively. Rod B³ extends between arms B² and $b^2$ and is rigidly attached to the outer end of each of said arms. Rod B³ extends at an angle of approximately twenty-three and one-half degrees from the axis formed by crank-pins B′ and $b'$. Intersecting crank-pins B′ and $b'$ and rigidly attached to each of said pins is ring C′, representing the solsticial colure. At right angles to ring C′ and rigidly attached thereto at the points of intersection is ring D′, representing the equinoctial colure. Ring E′ represents the equinoctial and is placed at right angles and rigidly attached to rings C′ and D′ wherever it intersects said rings. Within rings C′, D′, and E′ is globe F′, representing the terrestrial sphere. Globe F′ is rotatably mounted on rod B³ at the points on said globe representing the north and south poles of the earth. In the construction herein shown globe F′ is movably held in place on rod B³ by means of collars G′ and H′. I′ and I² are pointers which respectively represent the north and south poles of the heavens and are attached to rings C′ and D′ at points where said rings join. Pointers I′ and I² are in axial line with rod B³, which represents the earth's axis and the axis of the heavens and respectively extend toward star-maps O′ and O² at an angle of approximately twenty-three and one-half degrees from crank-pins B′ and $b'$. J′ is a ring outside of rings C′, D′, and E′ and is rigidly mounted on ring A² at right angles to the axis formed by crank-pins B′ and $b'$. Ring J′ has a rabbet K′, within which is movably placed ring L′. The upper surface of ring J′ represents the plane of the ecliptic, and upon said upper surface may be depicted the constellations of the zodiac and the three hundred and sixty degrees comprising a circle. One method of doing this is shown in Fig. 2. In constructing this my preferred form I preferably depict the time-ring (not shown) upon said ring J′ and in so doing preferably portray said time-ring in a manner similar to that shown in Fig. 3. Ring L′ lies in a plane with ring J′ and is preferably so constructed that its upper surface is flush with the upper surface of ring J′. The upper surface of ring L′ is adapted to have portrayed thereon the signs of the zodiac and the months of the year. One method of doing this is shown in Fig. 2. Rigidly attached to ring L′ are forked ears M′ M′, similar to ears M M shown in Fig. 2, one of said ears M′ being shown in Fig. 6. Said ears are so placed that ring C′ passes through each ear and is engaged thereby. Attached to ring A² are one or more star-maps, as indicated at O′ and O². These maps are stationary as related to the gyratory motion of axis B³ and pointers I′ and I². Upon crank-pins B′ and $b'$ are loose sleeves B⁴ and $b^4$, respectively, to which is rigidly attached arc R′, carrying sphere S′, representing the sun. Arc R′ is mounted within rings C′, D′, and E′, so as to cause sphere S′ to circulate around globe F′ in a plane with ring J′. I may affix a pointer (not shown) to either ring C′, D′, or E′, so as to have said pointer extend toward and operate in conjunction with the time-circle on ring J′.

The clamping device (shown in detail in Figs. 6 and 7) is constructed as follows: $a^2$ is a clamping-screw which is used to cause the journaled end of arm $a'$ to grip trunnion $a^3$, which is preferably cast integral with segment $a^4$. Segment $a^4$ is grooved, as at $a^5$, to receive ring A². $a^6$ is a screw threaded in trunnion $a^3$ and bears against plate $a^7$, which is set into a pocket in segment $a^4$. Plate $a^7$ bears against ring A². By means of screw $a^2$ I am enabled to loosen the grip of the journaled end of arm $a'$ upon trunnion $a^3$, and thus place ring A² in any position from the perpendicular to the horizontal I may desire, when by tightening screw $a^2$ I may hold ring A² in any such desired position. By means of screw $a^6$ I am enabled to cause plate $a^7$ to cease to bear against ring A², and thus to allow the movement of ring A² through groove $a^5$, when by again tightening screw $a^6$ plate $a^7$ will be again caused to bear against ring A² and hold ring A² in any desired position. By the adoption of this preferred form of construction, Fig. 5, I am enabled to place ring J′, representing the plane of the ecliptic, in any position I may desire, also to incline the whole apparatus at any angle within arms $a'\ a'$, thus providing a clearer view of the star-maps.

By the adoption of pointer I² and star-map O², I am enabled to demonstrate certain facts and theories of astronomy other than those which may be demonstrated by the modified form of my invention hereinbefore described.

The operation of the preferred form of construction, Fig. 5, is the same as that of the modified form, Fig. 1, viz: By causing the axis $B^3$ of globe $F'$ to gyrate clockwise around axis formed by crank-pins $B'$ and $b'$, thereby actuating rings $C'$, $D'$, and $E'$, pointers $I'$ and $I^2$, and ring $L'$, and by causing sphere $S'$ to circulate around globe $F'$ counter-clockwise all of the numerous facts and theories of astronomy which my invention is designed and adapted to illustrate may be demonstrated.

I do not limit myself to the exact construction herein shown or described, but desire to claim my invention in its broadest possible form.

What I claim, and desire to secure by Letters Patent, is—

1. The combination of a sphere, rotatably mounted, a plurality of rings mounted so as to rotate with said sphere, a non-rotatable ring at right angles to the axis upon which said sphere and rings rotate, and a movable ring in engagement with one of said rotatable rings.

2. The combination of a globe mounted so as to rotate upon a fixed center, a plurality of intersecting rings mounted so as to rotate with said globe, a non-rotatable ring lying in a plane bisecting said globe at right angles to the axis upon which said globe and rings rotate, a movable ring supported by said non-rotatable ring, means whereby said movable ring is engaged by one of said rotatable rings and a sphere mounted so as to circulate around said globe.

3. The combination of a stand, a revolving sphere rotatably mounted thereon, a plurality of intersecting rings encircling said sphere and rigidly attached so as to rotate with said sphere, a non-rotatable ring, one surface thereof lying in a plane bisecting said sphere at right angles to the axis upon which said sphere and rings rotate, a movable ring in engagement with one of said rotatable rings, a sphere mounted so as to circulate around said first-mentioned sphere and a star-map.

4. The combination of a stand, a globe representing the earth rotatably mounted thereon so that the points on said globe representing the north and south poles of the earth gyrate about the axis upon which said globe rotates, a plurality of intersecting rings encircling said globe and rigidly attached so as to rotate with said globe, a non-rotatable ring, encircling said rotatable rings and globe at right angles to the axis upon which said globe and rings rotate, a movable ring lying in a plane with said non-rotatable ring and engaged by one of said rotatable rings, a sphere mounted so as to circulate around said globe and a star-map.

5. The combination of a stand, a globe mounted so as to rotate upon an axis representing the axis of the earth, and also upon another axis representing the axis of the ecliptic, the said axis of the earth being caused to gyrate about said axis of the ecliptic, a plurality of intersecting rings encircling said globe and mounted so as to rotate with said globe on said axis of the ecliptic, a non-rotatable ring encircling said globe at right angles to said axis of the ecliptic, a movable ring in engagement with and actuated by one of said rotatable rings, a sphere mounted so as to circulate around said globe, a star-map, and a pointer in axial line with said axis of the earth and extending toward said star-map.

6. The combination of, a sphere, rotatably mounted, a star-map, a time-circle spaced so as to represent approximately twenty-five thousand eight hundred years, means whereby a pointer extending toward said time-circle is actuated in accordance with the movement of said globe in relation to said star-map.

7. The combination of, a stand, a globe rotatably mounted thereon, said globe being also pivotally mounted so as to revolve upon an axis extending at an angle of approximately twenty-three and one-half degrees from the axis upon which said globe rotates, a star-map, a pointer in axial line with said axis upon which said globe revolves and extending toward said star-map, a time-ring spaced so as to represent approximately twenty-five thousand eight hundred years, a pointer extending toward said time-ring, means whereby the position of said last-mentioned pointer is changed in accordance with the movement of said first-mentioned pointer.

8. The combination of, a stand, a globe rotatably mounted thereon so that the points on said globe representing the north and south poles of the earth are at an angle of approximately twenty-three and one-half degrees from the poles of the ecliptic, a star-map, a pointer in axial line with the point on said globe representing the north pole and extending toward said star-map, a time-circle spaced so as to represent approximately twenty-five thousand eight hundred years, a pointer extending toward said time-circle, means whereby the pointer extending toward said star-map is so actuated in relation to the movement of the pointer extending toward said time-ring as to indicate at any given period of time which star is the north-pole star.

9. The combination of a stand having a plurality of arms, a non-rotatable ring, a globe rotatably mounted at right angles to and encircled by said non-rotatable ring, a plurality of intersecting rings mounted so as to rotate with said globe, a movable ring in engagement with one of said intersecting rings, a sphere mounted so as to circulate around said globe in a plane with said non-rotatable ring, a star-map, a pointer in axial line with a point on said globe about twenty-three and one-half degrees from the axis upon which said globe rotates, a time-ring spaced so as to represent approximately twenty-five thousand eight hundred years, a pointer extending toward the circumference of said time-ring, the movement of either pointer being in exact relation to the movement of the other pointer.

10. The combination of a stand, having a plurality of arms, a non-rotatable ring, a globe rotatably mounted within said non-rotatable ring upon an axis extending at right angles to said ring, said globe being also rotatably mounted on another axis extending at an angle of approximately twenty-three and one-half degrees from said first-named axis, a plurality of rings encircling said globe and attached so as to rotate with said globe upon said first-mentioned axis, a movable ring lying in a plane with and encircled by said non-rotatable ring, said movable ring being in engagement with and actuated by one of said rotatable rings, a star-map, a pointer in axial line with the axis set at an angle of twenty-three and one-half degrees from the axis first herein named, said pointer being extended toward said star-map, a time-circle spaced so as to represent approximately twenty-five thousand eight hundred years, a pointer extending toward said time-ring and actuated by the movement of said globe and rotatable rings, and a sphere mounted so as to move in a circular plane around said globe.

In testimony whereof I have signed my name to this specification in the presence of two subscribing witnesses.

FRANKLIN H. MACKENZIE.

Witnesses:
 FRED S. PAYNE,
 ISAAC GORDON.